July 6, 1926.

F. HODGKINSON

TRANSMISSION GEARING

Filed August 13, 1923

1,591,826

2 Sheets-Sheet 1

F. Hodgkinson
INVENTOR

BY
ATTORNEY

July 6, 1926. 1,591,826

F. HODGKINSON

TRANSMISSION GEARING

Filed August 13, 1923  2 Sheets-Sheet 2

WITNESSES:

F. Hodgkinson
INVENTOR

BY
ATTORNEY

Patented July 6, 1926.

1,591,826

UNITED STATES PATENT OFFICE.

FRANCIS HODGKINSON, OF SWARTHMORE, PENNSYLVANIA, ASSIGNOR TO WESTINGHOUSE GEAR & DYNAMOMETER COMPANY, A CORPORATION OF PENNSYLVANIA.

TRANSMISSION GEARING.

Application filed August 13, 1923. Serial No. 657,136.

My invention relates to a transmission gear and it has for its object to provide apparatus of the character designated which shall be peculiarly adapted for the transmission of mechanical loads embodying frequent and abrupt changes in torque, and which shall operate smoothly and without undue tooth strains under these conditions.

More particularly my invention relates to the provision of resilient supporting means for one or both members of a pair of meshing gears such that, upon an increment in the tooth pressure, the supporting means yields slightly and vice versa.

Figure 1:
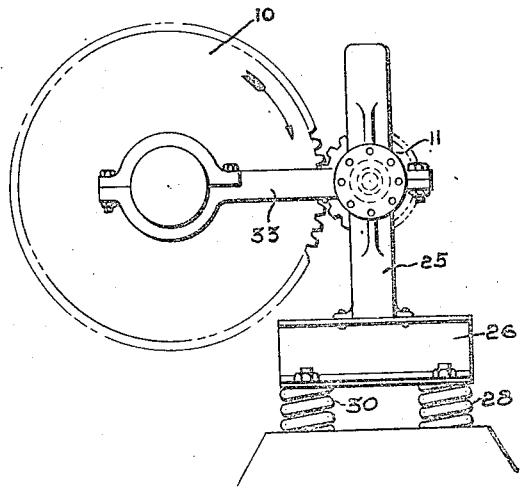
Figure 2:
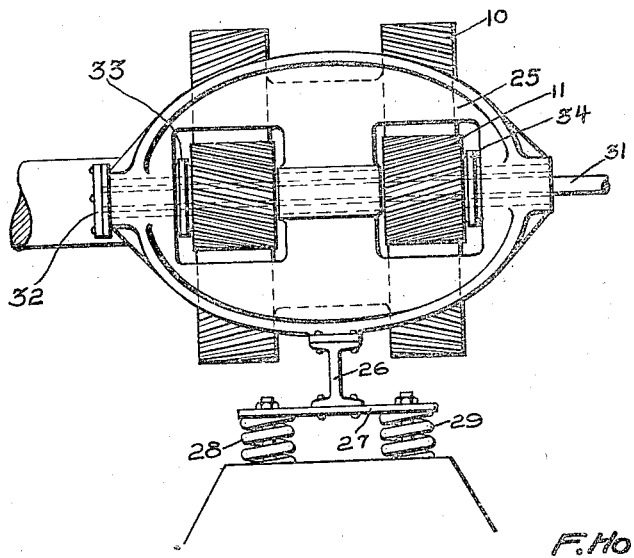
Figure 3:
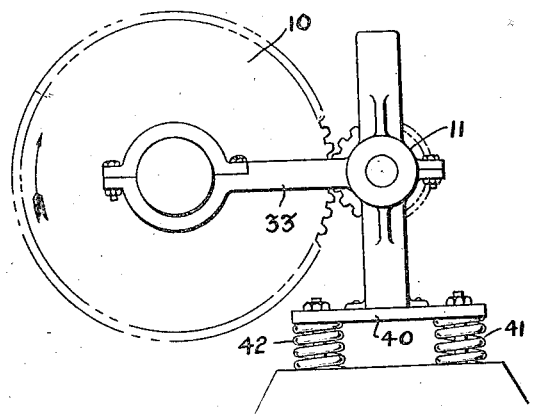
Figure 4:
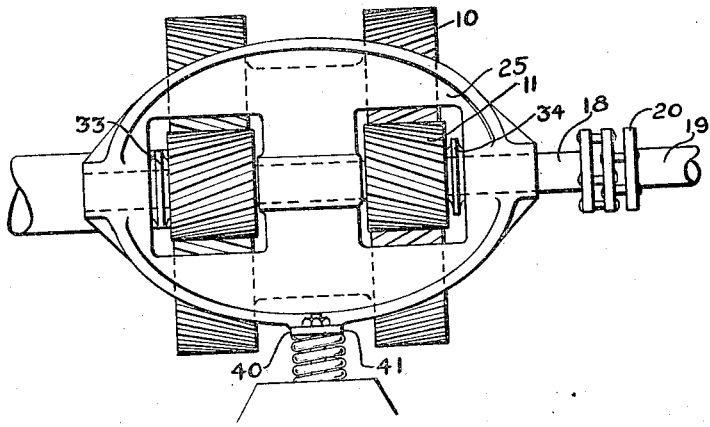

In the accompanying drawing, Fig. 1 is an end view of a pair of meshing gears embodying resilient supporting means for one of the gears, constructed in accordance with my invention; Fig. 2 is a side view of the apparatus shown in Fig. 1; and Figs. 3 and 4, are views similar to Figs. 1 and 2 and illustrate another form of gearing.

In the operation of heavy gearing, such as the reduction gearing for ships and as employed in driving large low-speed pumps and rolling mills, the torque is subject to frequent and abrupt variation, resulting in a hammer blow effect on the teeth with possible breakage thereof. These torque variations may arise from errors in tooth cutting, resulting in unequal tooth spacing, or they may be established or aggravated by torsional vibration of the driven shaft arising from periodic load variation, particularly of such frequency as to establish a resonant condition. In accordance with the present invention, I support one or both of the members of the gear pair upon spring means such that upon an increment in the torque, one or both gears will yield, thus rendering more gradual the application of the increased load to the tooth, and avoiding sudden and disastrous hammer effects.

Obviously the continual change in position of the resiliently-mounted gear necessitates connection thereto through a flexible shaft. The use of a flexible shaft also permits the gear to be mounted for tilting in a plane normal to the axial plane of the two gears, in order to distribute the tooth pressure in a manner well-known in the art.

Referring to Figs. 1 and 2 for a more detailed description I show a pinion 11 arranged to drive a gear 10, the pinion 11 being mounted in a rigid floating frame 25 and this frame being mounted on a small section of I-beam 26 so as to permit tilting thereof, all as is well-known in the art and as described and claimed in U. S. Patent No. 946,455 issued to G. W. Melville and J. H. Macalpine on January 11, 1910.

The I-beam 26 is bolted to a plate 27 which is carried by four heavy coil springs 28, 29, 30 and one not shown.

In the operation of the gear thus illustrated, the flexibility of the web of the I-beam 26 permits tilting of the floating frame 25 for equalization of tooth pressures, and the yielding support afforded by the springs 28, 29 and 30 relieves the teeth of abrupt changes in load due to attempts to suddenly change the angular velocity of the gear; the inertia of the floating frame and of the pinion alone tending to produce a hammer blow effect.

It will also be observed that the springs 28, 29 and 30 assist the I-beam 26 in permitting the floating frame 25 to tilt.

The drive shaft 31 for the pinion 11 is passed through an opening within said pinion and is attached thereto at the left-hand end, as indicated at 32. By this construction sufficient flexibility may be imparted to the drive shaft to permit motion of the pinion 11 in the manner indicated, without undue strain or mis-alignment of the drive shaft 31.

Inasmuch as the tooth pressure acts in an oblique direction, it will be noted that there is a component of force tending to thrust the pinion 11 away from the gear 10 and under severe loads it might well happen that the spring 28 would compress and the spring 30 stretch to such an extent as to permit the teeth of the pinion 11 to disengage from the teeth of the gear 10. In order to prevent this action and yet at the same time to utilize the beneficial features of my invention, I may provide a radial link 33 between the shafts of the gear and of the pinion, a similar link 34 being placed beyond the gear as indicated in Fig. 4. It will be noted that when employing these restraining links, the center of the pinion 11 describes an arc when the springs 28, 29 and 30 are compressed or expand, rather than having a straight line motion, but this deviation from a straight line motion is so minute throughout the relatively short arc of travel, that in the subjoined claims I shall consider the motion of the floating frame and of the pinion under the influence of load increments or decrements as a straight line motion, or motion of translation.

Referring to the form of my invention shown in Figs. 3 and 4, the arrangement is in general similar to that of Figs. 1 and 2, except that no I-beam support is provided under the floating frame, but rather the floating frame is bolted to a plate 40 mounted upon two springs 41 and 42 which at the same time provide for translation of the floating frame 25 under increment or decrement of load, and also provide for tilting thereof in order to properly equalize the tooth pressures in the two rows of teeth. The links 33 and 34 are also employed for the same purpose as pointed out in connection with Figs. 3 and 4.

While I have herein described my invention as applied to a reduction gear, it is obvious that, if desired, the pinion may be the driven member rather than driving member, and the meshing gears may have any desired speed ratio therebetween. Furthermore, while I have shown the yielding support as applied to but one of two intermeshing gears, it is obvious that, if desired, the same means may be applied to both gear members.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a power transmitting device, the combination of a driving gear, a driven gear meshing therewith, and resilient and flexible means for supporting one of the gears, said resilient means being capable of movement in the direction of tooth thrust and said flexible means being capable of movement in a plane normal to the plane of the gear axes.

2. In a power transmitting device, the combination of a driving gear, a driven gear meshing therewith, resilient supporting members for one of the gears, whereby said gear may oscillate in synchronism with the angular vibrations of the meshing gear, and flexible supporting means for the same gear, whereby said gear may tilt in a plane normal to the plane of the gear axes for distributing tooth pressure.

3. In a power transmitting device, the combination of a driving gear, a driven gear meshing therewith, a rigid frame member for carrying one of the gears, a flexible supporting member for the frame member capable of tilting movement in a plane normal to the plane of the gear axes, a resilient supporting member for the frame member capable of movement in the direction of tooth thrust, and means for maintaining the distance between the gear centers constant.

4. In a power transmitting device, the combination of a driving gear, a driven gear meshing therewith, a rigid frame member for carrying one of the gears, a flexible supporting member for the frame member capable of tilting movement in a plane normal to the plane of the gear axes, a resilient supporting member for the frame member capable of movement in the direction of tooth thrust, means for maintaining the distance between the gear centers constant, and a flexible drive shaft secured to the flexibly and resiliently supported gear.

In testimony whereof, I have hereunto subscribed my name this 6th day of August, 1923.

FRANCIS HODGKINSON.